United States Patent [19]

Treiber

[11] Patent Number: 4,805,760

[45] Date of Patent: Feb. 21, 1989

[54] PACKAGE POSITIONING APPARATUS AND METHOD

[75] Inventor: Fritz F. Treiber, Centerville, Ohio

[73] Assignee: Hobart Corporation, Troy, Ohio

[21] Appl. No.: 86,121

[22] Filed: Aug. 17, 1987

[51] Int. Cl.$^4$ ............................................. B65G 47/26
[52] U.S. Cl. ..................................... 198/456; 198/636
[58] Field of Search ................... 198/456, 599, 636; 414/28, 35, 36

[56] References Cited

U.S. PATENT DOCUMENTS

| | | | |
|---|---|---|---|
| 3,089,576 | 5/1963 | Sauer et al. | 198/456 |
| 3,194,710 | 7/1965 | Stremke et al. | 156/360 |
| 3,470,997 | 10/1969 | Trounce | 198/456 |
| 3,872,644 | 3/1975 | Giraudi et al. | 53/52 |
| 4,415,048 | 11/1983 | Teraoka | 177/5 |
| 4,458,470 | 7/1984 | Fine | 53/502 |
| 4,505,092 | 3/1985 | Bowers et al. | 53/504 |
| 4,548,024 | 10/1985 | Fine | 53/502 |

*Primary Examiner*—Joseph E. Valenza
*Attorney, Agent, or Firm*—Biebel, French & Nauman

[57] ABSTRACT

A method for positioning articles to be processed by a machine is performed by apparatus comprising first and second article guide members which convergently extend into an article entryway along which articles are conveyed. The guide members are spring biased into an article positioning orientation across at least a portion of the entryway and maintained in that article positioning orientation by first and second levers extending beneath the article entryway and including an interlock. The interlock releases the article guide members only upon an article contacting both of the guide members. The interlock comprises a release slot and at least one locking notch extending from one side of one end of the slot on one lever and a pin for engaging the slot and locking notch on the other lever. When the pin is engaged in the locking notch, the first and second guide members are retained in a package positioning orientation such that an article engages one or the other of the package guides and is moved laterally to a desired position by the guide as the article is conveyed along the entryway. Upon engaging both guide members, the pin is removed from the locking notch and moves within the slot to release the guide members and permit the positioned package to progress along the entryway toward a processing station of the machine.

16 Claims, 7 Drawing Sheets

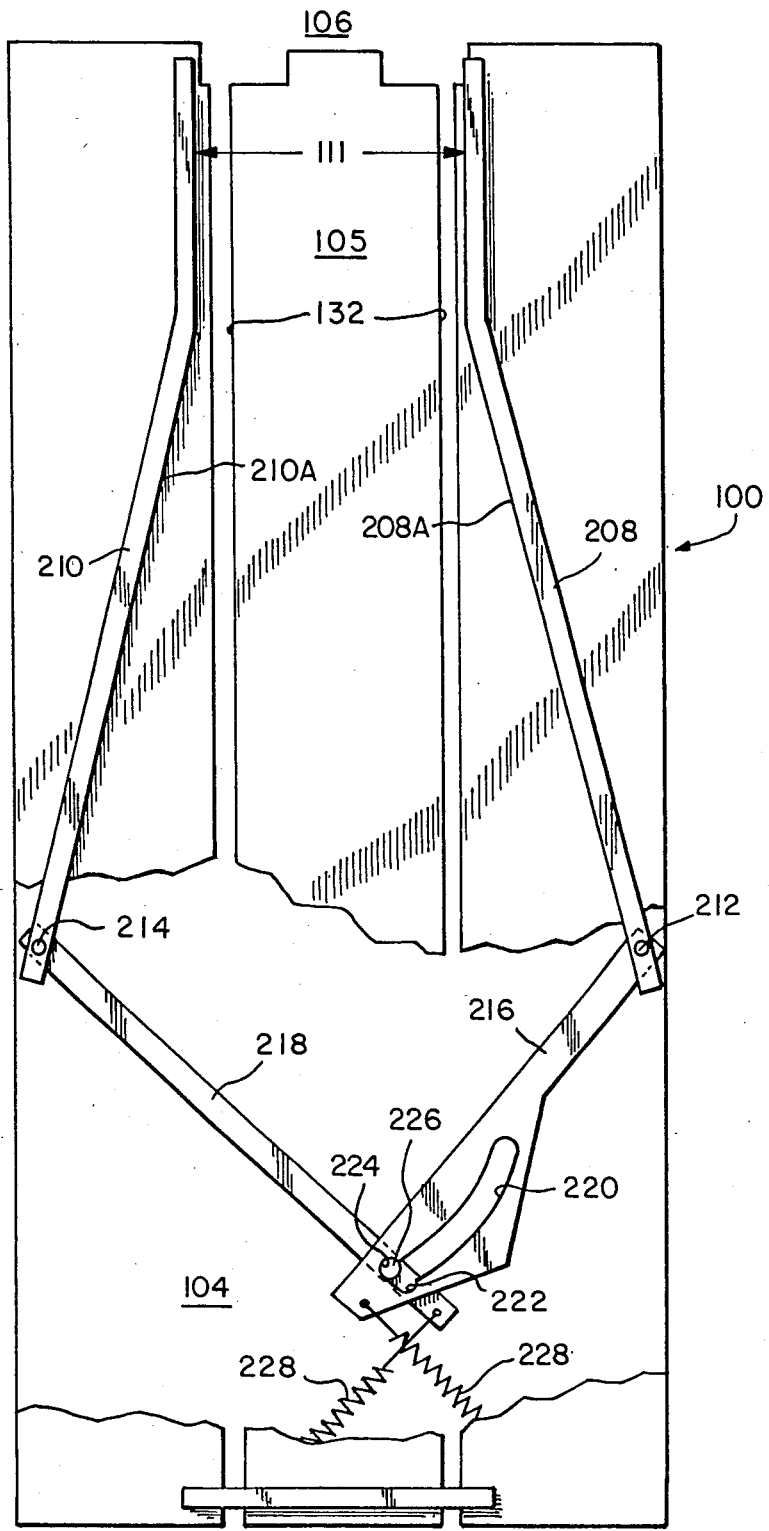

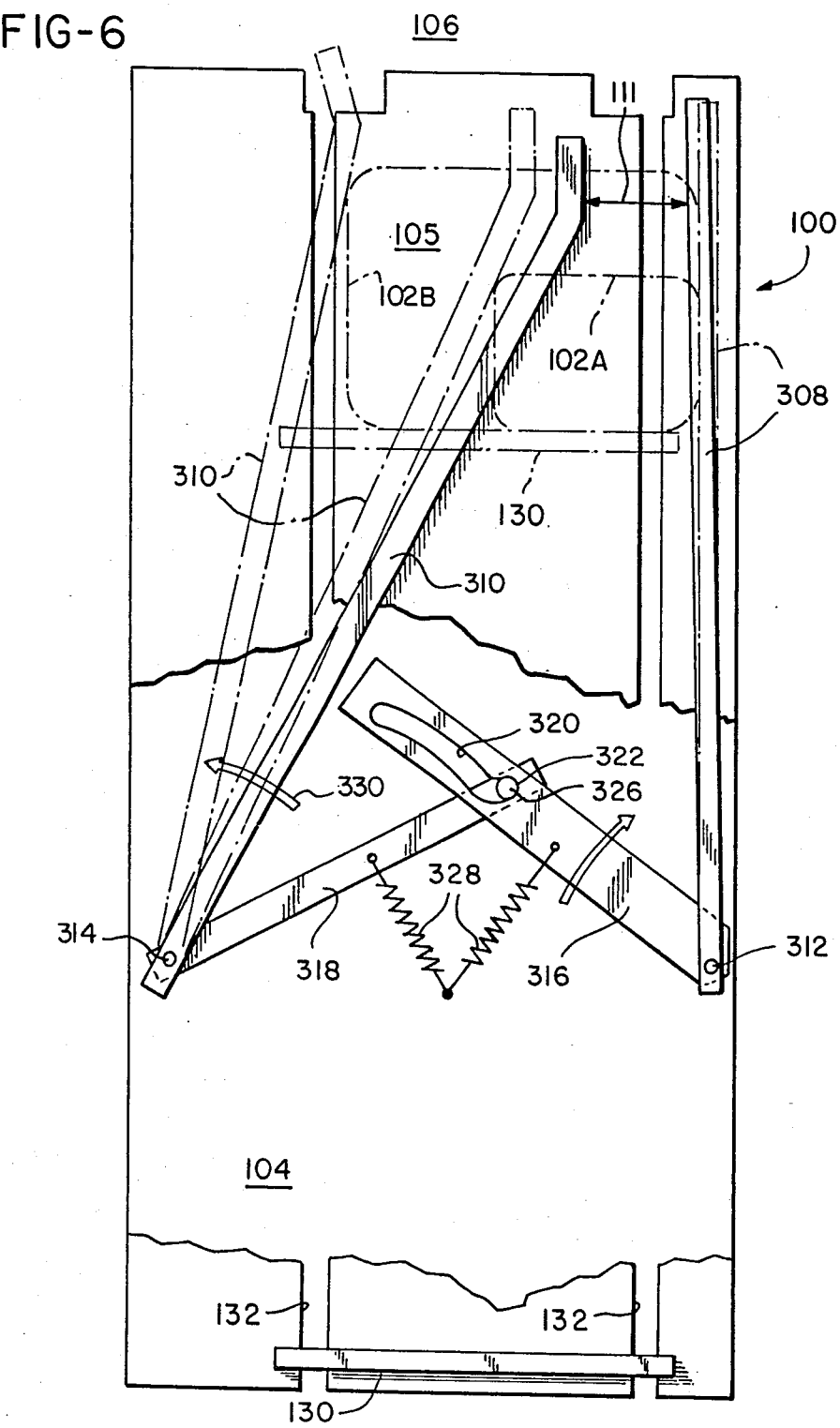

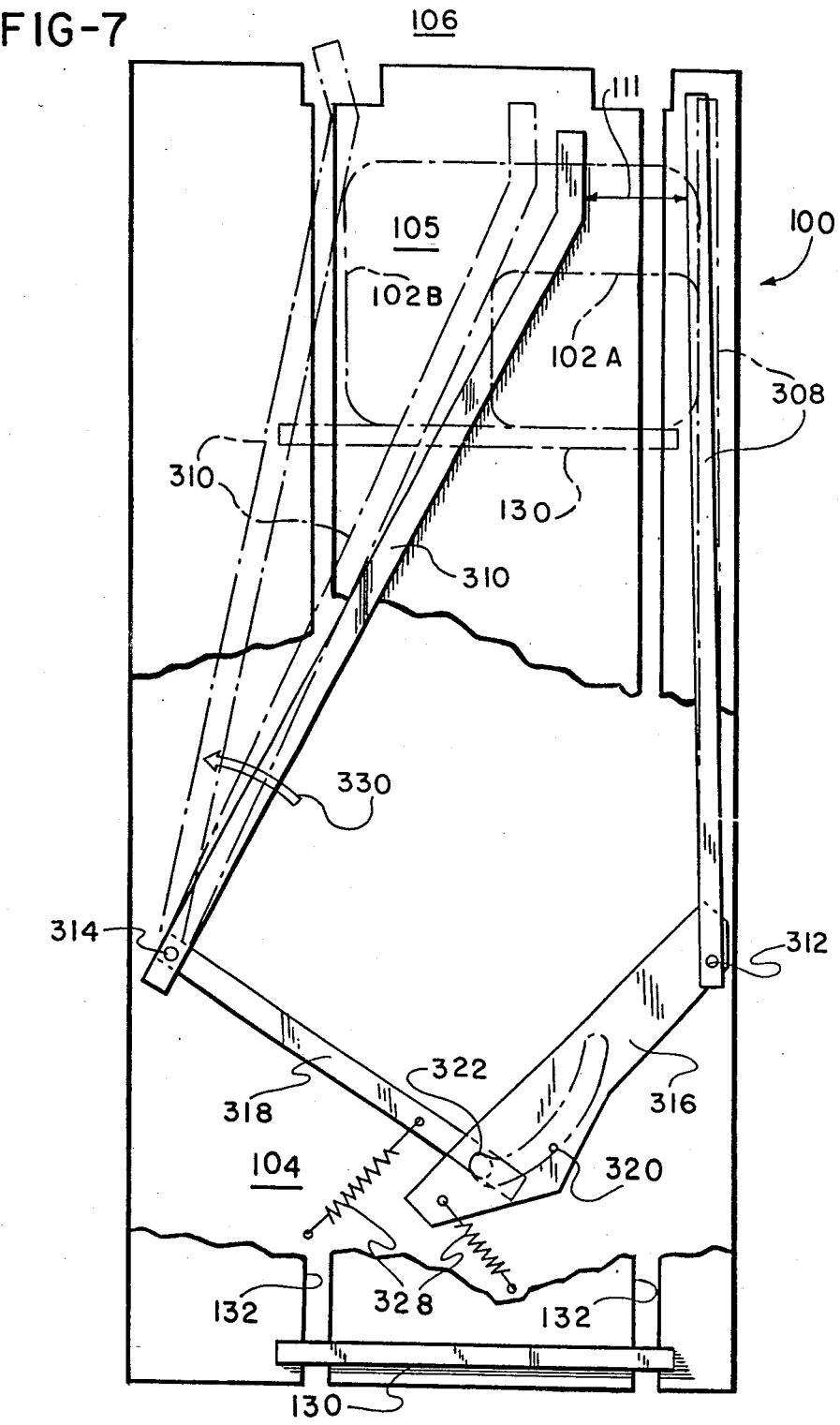

PACKAGE POSITIONING APPARATUS AND METHOD

BACKGROUND OF THE INVENTION

The present invention relates generally to machines for receiving and processing articles, and more particularly, to a method and apparatus for positioning articles in such machines as the articles are conveyed. While the present invention is generally applicable to a variety of machines, it is particularly applicable to package wrapping machines wherein packages to be wrapped must be positioned at a particular location in a wrapping station to ensure that the packages are properly wrapped and do not jam the wrapping machines.

Article positioning within machines is commonly performed to permit standardized or automated operations to be carried out on the articles. For example, boxes, bottles, other containers or packages may be moved to a desired position for filling, labeling, wrapping or otherwise processing the article or its contents. In the prior art, a variety of article positioning arrangements have been utilized.

Articles can, of course, be positioned by hand; however, hand or manual positioning relies upon a machine operator and can result in reduced production and mispositioning which can jam or damage a machine. The simplest and most common mechanical arrangement is a plow or article guide angularly extending into a path along which articles must pass or be conveyed. In such article positioning arrangements, articles engage and slide along the guide until they reach a desired position defined by the guide. Usually, such guides are manually adjustable and must be set for a given article size or configuration.

Other prior art package positioning arrangements include active apparatus, such as rollers and cross-belts, which are used to carry packages in two mutually perpendicular directions to thereby convey packages to an alignment edge of a conveyor or other desired position. Alternately, plows or package grippers may be dynamically operated by means of electrical, pneumatic or hydraulic solenoids such that they engage and force an article to a desired position. Dynamic positioning plows or package grippers are typically spring-loaded or otherwise resilient such that they are not likely to damage articles they are positioning.

In one article positioning application for a package elevating wrapping machine, packages must be substantially centered on an elevator for proper wrapping and to prevent interference and/or jams with remaining portions of the machine. Such a wrapping machine is disclosed in U.S. Pat. No. 4,505,092. In that patent, a combination package width sensing and centering arrangement comprises a pair of swing arms which are pivotally mounted on opposite sides of a package entryway. The swing arms are spring-biased to force the arms to angularly extend into the package entryway above its floor. The resiliency of the springs biasing the swing arms into the package entryway is sufficient to permit the arms to be deflected by entering packages to thereby sense the width of those packages, yet tends to center packages within the entryway of the machine. While this arrangement assists package positioning or centering within the machine to a limited extent, the initial positioning of packages by the operator is still essential to achieve proper machine operation and/or wrapping.

Manually adjustable plows do not provide the versatility required by an automatic machine, particularly one that is used to process a large variety of article sizes, since an operator would be required to repetitively adjust the positioning plows manually. While the mechanically operated positioning or centering devices can overcome the difficulty of the manually adjustable plows, they require motive and control apparatus which complicates and adds to the expense of machines including such devices. Further, since the balance of the springs and frictional mountings of the devices are not always perfect, article positioning tends to vary. Furthermore, if the spring-bias is set too high, lighter packages can be damaged; and, if it is set too low, heavier packages will override and defeat the positioning device.

It is, thus, apparent that the need exists for an accurate article positioning device which does not rely on complicated and expensive drive mechanisms, or spring-biasing, but provides a positive preferably mechanical arrangement for consistently and inexpensively positioning articles to be processed by a machine.

SUMMARY OF THE INVENTION

The problems of the prior art are overcome in accordance with the present invention by providing a pair of article guides which are positioned along a path which is traversed by the articles as they enter the machine. The article guides converge toward one another when in an article positioning orientation to define a throat or closest approach which must inherently be no wider than the lateral dimension of the minimum-sized article which is to be positioned. The two article guides are interlocked such that neither guide may be substantially moved from the article positioning orientation until an article has been substantially positioned which is signaled by both guides being engaged by the article. At that time, the interlock releases the guides to allow the positioned article to pass into the machine.

In accordance with one aspect of the present invention, article positioning apparatus for a machine into which articles are conveyed along an article entryway comprises first and second convergent article guide means movably extending into the entryway for engaging and positioning articles being conveyed along the entryway. Control means connected to the first and second article guide means provide for maintaining the article guide means in an article positioning orientation until both the first and second article guide means are engaged by an article upon substantial positioning of the article. The article guide means preferably comprise first and second article guide members which are mounted along the sides of the entryway for pivotal movement above and into the entryway. The control means for the article guide members comprise first and second levers which are connected to the first and second guide members and extend beneath the entryway and include releasable locking means incorporated into their distal ends for locking the first and second guide members for article positioning, with the locking means being released upon both of the first and second guide members being engaged by an article.

In one embodiment of the present invention, the releasable locking means comprises a release slot and a locking notch extending from one side of one end of the slot in the first lever, and a pin extending from the second lever for engaging the slot and locking notch. Resilient means provide for biasing the levers, and hence, the package guide members to an article positioning orientation wherein the pin engages the locking notch such that an article moving in the entryway will be positioned by engaging one of the guide members which is restrained from movement by the pin and the locking notch until the article engages both guide members to remove the pin from the locking notch for movement along the slot.

In another embodiment of the article positioning apparatus of the present invention, the releasable locking means comprises a release slot and locking notches extending from opposite sides of one end of the slot in the first lever, and a pin extending from the second lever for engaging the slot and locking notches. Resilient means provide for biasing the levers, and hence, the package guide members to an article positioning orientation wherein the pin engages one of the locking notches. In accordance with this embodiment, an article moving in the entryway will be positioned by engaging one of the guide members which is restrained from movement by the pin and one locking notch until the article engages both guide members to remove the pin from the one locking notch for movement along the slot. Alternately, an article moving in the entryway will be positioned by engaging the other guide member which will move its associated lever to engage the pin with the other of the locking notches to restrain the levers and guide members from further movement until the article engages both guide members to remove the pin from the other locking notch for movement along the slot. The levers may extend at substantially any suitable angle (acute, right or obtuse) relative to their associated guide members, and the slot is preferably arcuate to facilitate smooth movement of the article positioning apparatus.

The article positioning apparatus of the present invention can be utilized to position a variety of article sizes to ne side of an article entryway, or to center articles upon an article entryway, or can be used to position a given size of article at substantially any position across an article entryway. In the illustrated embodiments, the article entryway extends between an infeed station and an outfeed station which leads to an article processing station, the machine is a package wrapping machine and the articles are hence packages.

In accordance with another aspect of the present invention, a method of aligning articles in a predetermined lateral relationship to a conveyor along which the articles are carried comprises the steps of: placing an article on the conveyor at an infeed station; engaging the article by means of a pusher to carry the article from the infeed station along the conveyor toward an outfeed station; locating guide members along and on opposite sides of the conveyor, with the guide members converging in the direction of article feed and being spaced apart at their narrowest point of convergence by a dimension equal to or less than articles as dimensioned across the conveyor; sensing an article which is misaligned from a desired lateral alignment by engagement of the article with one of the guide members; locking the guide members in an aligning position to thereby laterally urge a misaligned article along the guide member toward the desired lateral alignment as the article is carried along the conveyor by the pusher; sensing the desired lateral alignment of the article by engagement of the article with the other of the guide members; unlocking the guide members in response to sensing the desired lateral alignment of the article to enable outward movement of the guide members to permit free passage therebetween of the aligned article; and continuing to push the aligned article toward the outfeed station.

It is, therefore, a primary object of the present invention to provide an improved method and apparatus for article positioning which is inexpensive and avoids the need for positioning drive mechanisms or balanced spring-biasing and which, by positive prefer ably mechanical operation, consistently positions articles as the articles are carried along a conveyor.

It is another object of the present invention to provide an improved method and apparatus for article positioning utilizing first and second article guide members which extend into an article entryway of a machine for engaging and positioning articles conveyed along the entryway including control means connected to the article guide members for maintaining them in an article positioning orientation until both the article guide members are engaged by an article once substantially positioned whereupon the guide members are released to permit the positioned article to pass.

It is yet another object of the present invention to provide an improved method and apparatus for article positioning utilizing first and second article guide members convergently extending into an article conveyor for engaging and positioning articles moving along the conveyor wherein the guide members are controlled by means of first and second levers which include, respectively, a slot and at least one locking notch and a pin for engaging the slot and locking notch.

Other objects and advantages of the invention will be apparent from the following description, the accompanying drawings and the appended claims.

BRIEF DESCRIPTION OF THE DRAWINGS

FIG. 5 is a plan view of an alternate embodiment of the article positioning device of FIGS. 1–4.

FIGS. 6–7 are plan views of two alternate embodiments of an article positioning device in accordance with the present invention used in a package wrapping machine to position or align packages to one side of a package entryway.

DETAILED DESCRIPTION OF THE INVENTION

The present invention is generally applicable to article positioning including article centering within a variety of machines; however, it is particularly applicable to package wrapping machines, and accordingly, will be described with reference to use in a package elevating wrapping machine, such as that disclosed in U.S. Pat. No. 4,505,092, which is hereby incorporated by reference. Since the description is made relative to a package wrapping machine, the terms "package(s)" and "article(s)" will be used interchangeably herein; however, it should be understood that such terms are to be interpreted as any article which is to be positioned for processing by a machine.

Figure 1:
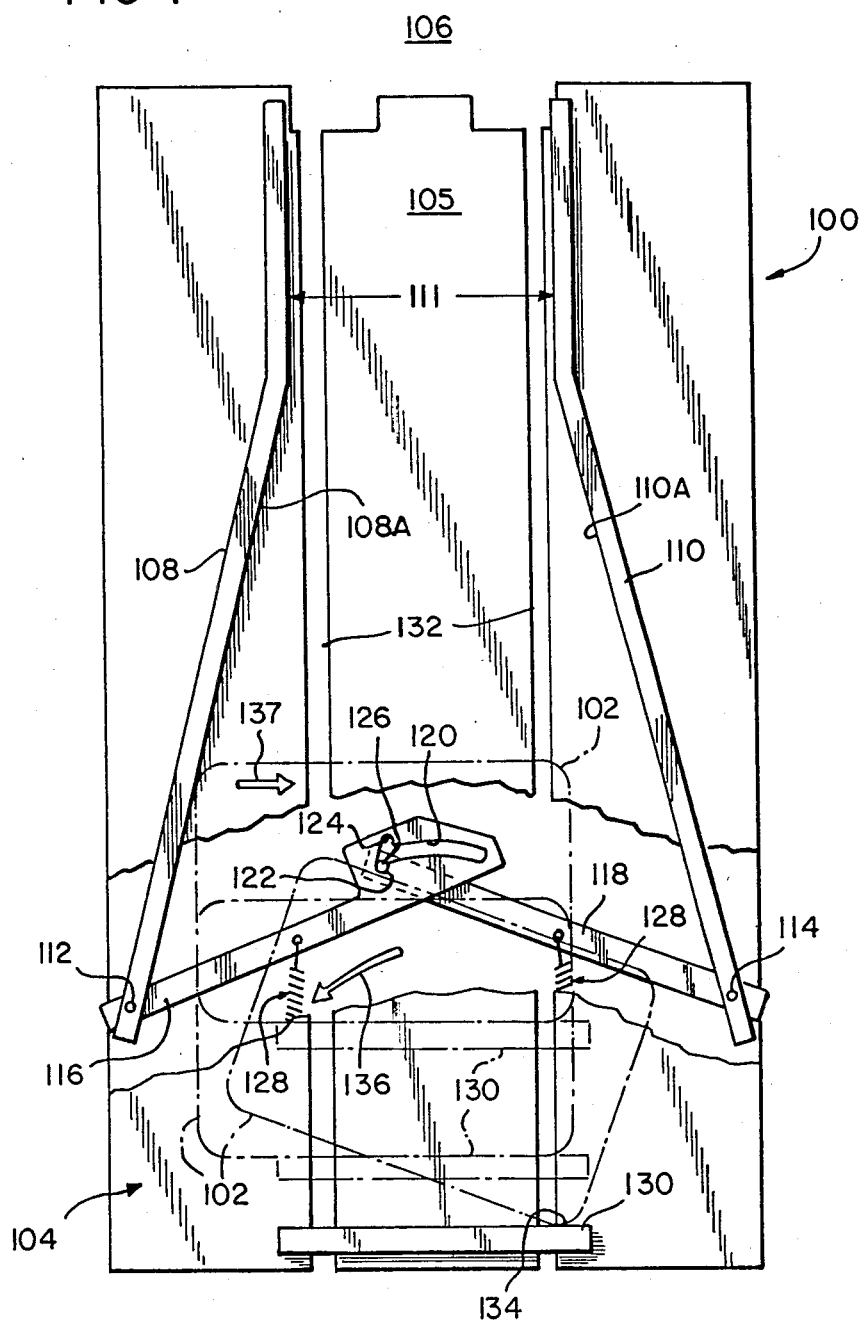
FIGS. 1–4 are plan views of the operation of an article positioning device in accordance with the present invention used for centering packages in a package wrapping machine.

A first illustrated embodiment of article positioning apparatus in accordance with the present invention is shown in FIG. 1 installed on a package entryway 100 of a package wrapping machine. Packages to be wrapped, represented by the packages 102, are placed into an article or package infeed station 104. The packages 102 are conveyed along the upper surface of the package entryway 100 through an outfeed station 105 to an article processing station 106 located beyond the end of the package entryway 100. In this case, the article processing station 106 comprises a package wrapping station.

Figure 2:
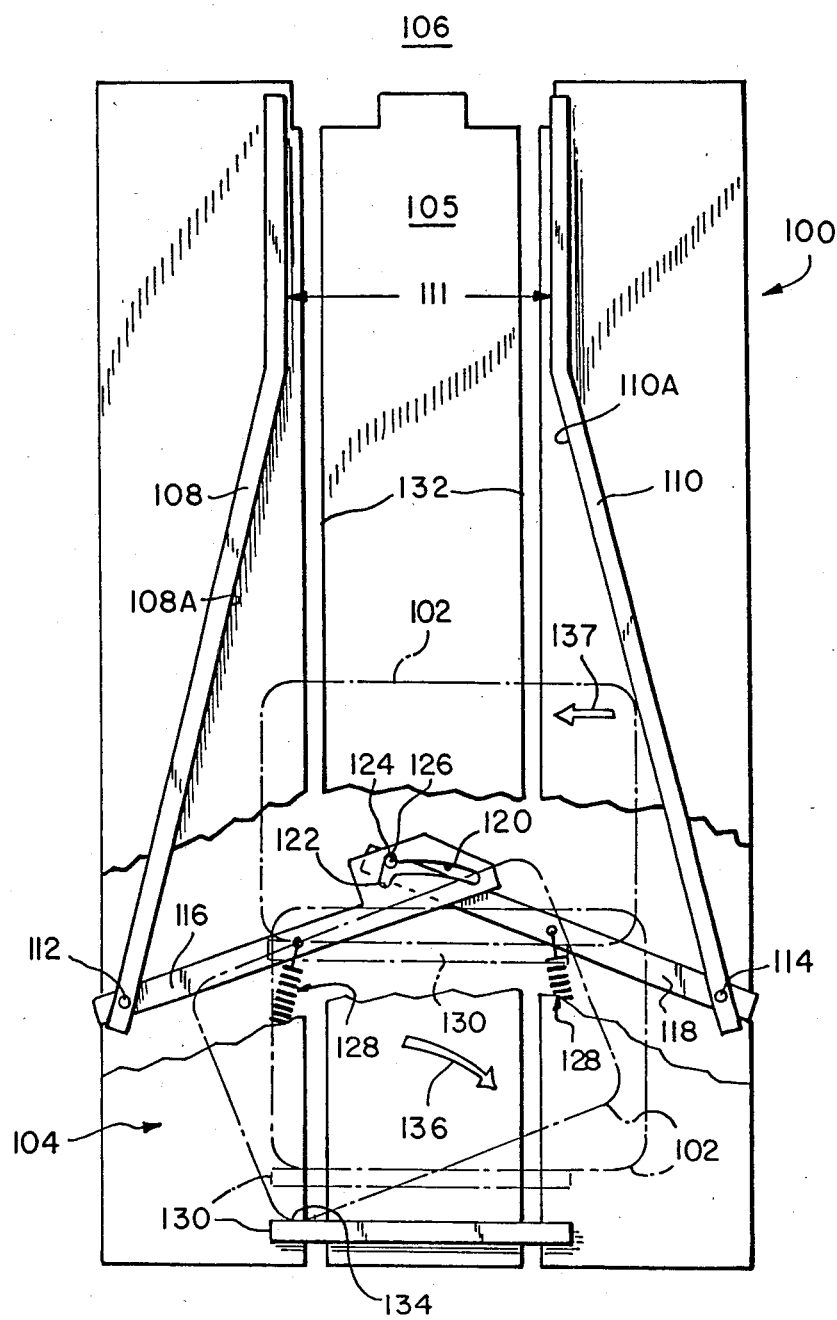

In the illustrated embodiment, first and second article guide means comprise first and second article guide members 108, 110 which extend into the entryway 100 for engaging and positioning packages 102 which are being conveyed along the entryway 100. The article guide members 108, 110 converge toward one another when in an article positioning orientation, as shown in FIGS. 1 and 2, to define a throat 111 or closest approach which must inherently be no wider than the minimum-sized article which is to be positioned. The first and second guide members 108, 110 extend toward the processing station 106 and are mounted along the sides of the entryway 100 adjacent the infeed station 104 for pivotal movement about axes defined by posts 112 and 114 into and above the entryway 100. While this form of pivotal mounting is preferred, it is noted that mounting arrangements permitting purely lateral movement can be used in the present invention as will be apparent to those skilled in the art.

Control means comprising first and second levers 116, 118 are connected to the article guide members 108, 110 beneath the entryway 100 via the posts 112, 114 for maintaining the article guide members 108, 110 in an article positioning orientation as shown in FIG. 1 until both of the article guide members 108, 110 are engaged by the package 102 which signals substantial centering of the package 102. The first and second levers 116, 118 include releasable locking means incorporated into their distal ends for locking the first and second guide members 108, 110 for article positioning, with the locking means being released upon engagement of both the first and second guide members 108, 110 by the package 102.

In the embodiment illustrated in FIGS. 1-4, the locking means comprises an arcuate release slot 120 formed in the distal end of the first lever 116 and having locking notches 122, 124 extending from opposite sides of its base or notched end. A pin 126 extends from the second lever 118 for engaging the slot 120 and the locking notches 122, 124. Resilient means comprising extension springs 128 bias the levers 116, 118, and hence, the package guide members 108, 110 to an article positioning orientation wherein the pin 126 engages the locking notch 122 formed into the base or notched end of the slot 120.

Operation of the first illustrated embodiment of the article positioning apparatus of the present invention will now be described with reference to FIGS. 1-4. As shown in FIG. 1, the package 102 is conveyed or pushed from the infeed station 104 through the outfeed station 105 to the wrapping or processing station 106 by means of a package pusher 130 which extends above the upper surface of the package entryway 100 through slots 132 in the entryway 100.

The article positioning apparatus, as shown in FIGS. 1-4, serves to center packages for proper positioning in the package wrapping station. Also, as the package 102 is pushed from the package infeed station 104 to the processing or package wrapping station, the package is not only centered relative to the entryway 100, but if it is initially placed into the machine at an angular orientation, as shown in FIGS. 1 and 2, it will be squared or straightened out by the interaction of the package 102 with the package pusher 130. This initial "squaring up" or "truing" of the package 102 is due to rotation about a contact point 134 with the package pusher 130 which rotates the package 102 about the contact point 134 as indicated by the arrow 136 until the package 102 is squarely engaged by the package pusher 130.

In FIG. 1 the package 102 initially engages the guide member 108 on the left side of the entryway 100. As noted and shown, the package 102 is initially squared up or trued by the package pusher 130. The guide member 108 is restrained from pivotal movement by the pin 126 which is engaged with the locking notch 122. Hence, as the package 102 is pushed or conveyed towards the processing station 106 it is moved to the right as shown by the arrow 137 in FIG. 1 as the package 102 slides over the entryway 100 and along the angled interior face 108A of the guide member 108.

Figure 3:
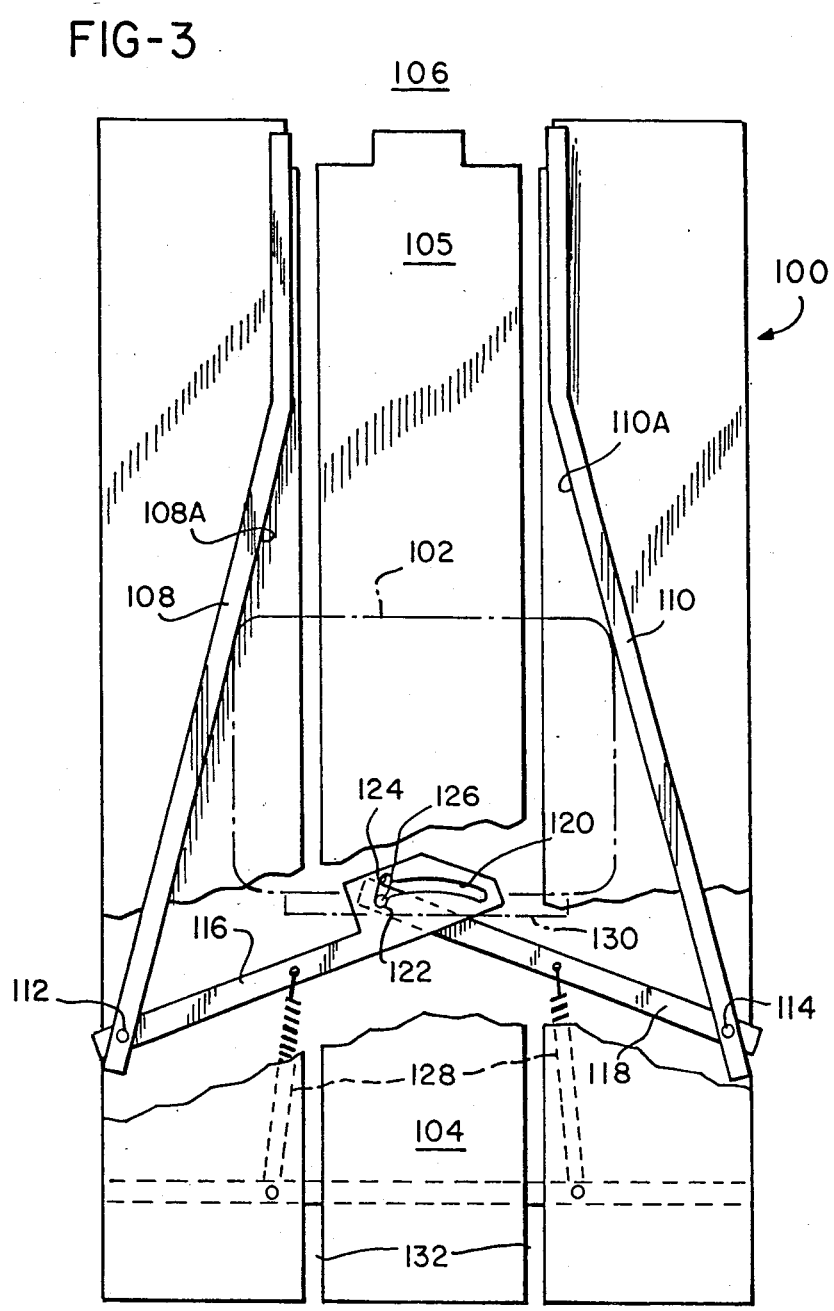
Figure 4:
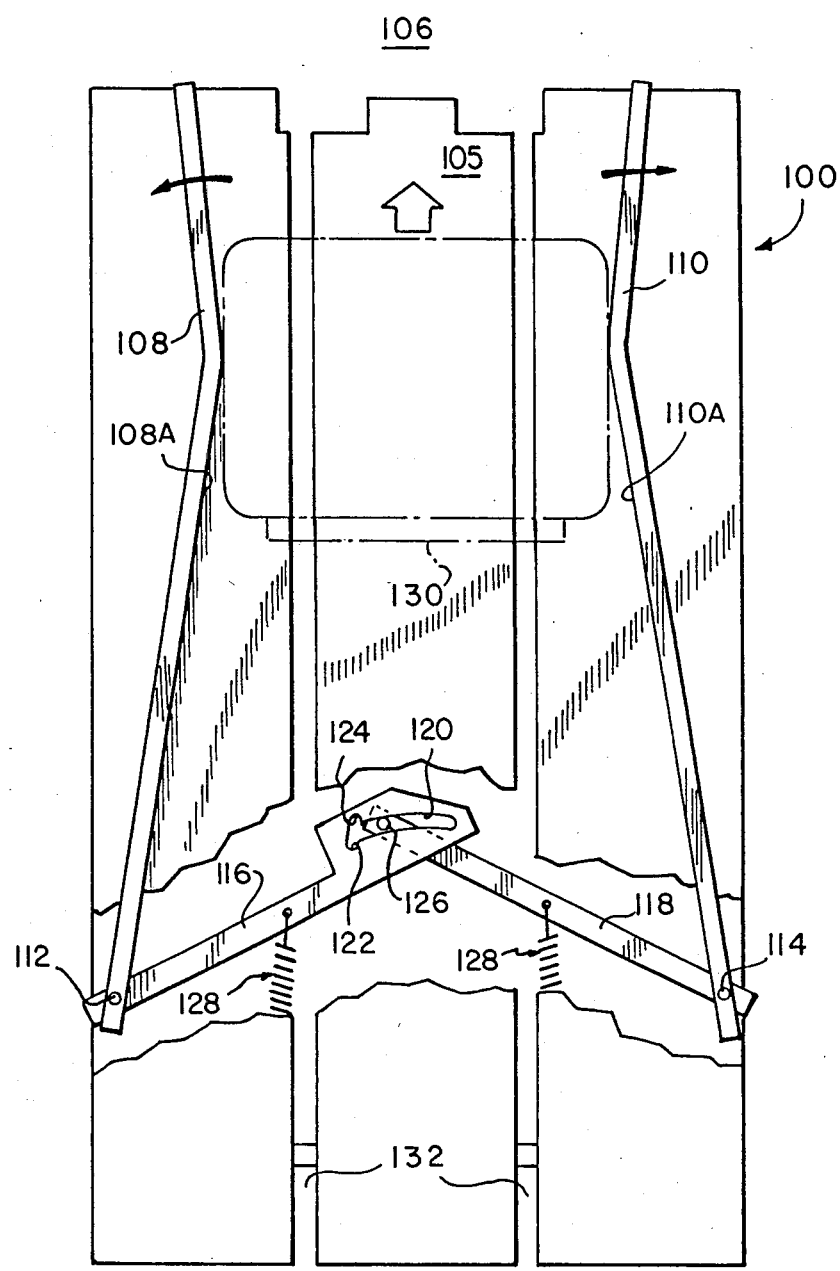

Ultimately, the package 102 reaches the centered position shown in FIG. 3 where the package 102 engages both guide members 108, 110. Upon initial engagement of the guide member 110 by the package 102, the guide member 110 pivots outwardly to a position where the pin 126 is removed from the locking notch 122 into alignment with the slot 120. Since both guide members 108, 110 are engaged by the package 102, they will both now be released and pivoted outwardly as the pin 126 and the slot 120 move relative to one another as shown in FIG. 4. In this way, a package which is initially off-centered to the left and possibly canted or angularly oriented is squared up and centered on the package entryway 100 for delivery to the processing station 106.

In FIG. 2 operation of the embodiment illustrated in FIGS. 1-4 is shown for a package 102 which is offset to the right of the infeed station 104 and once again canted or angularly oriented. The package 102 is initially contacted by the package pusher 130 at the contact point 134. The package 102 is initially squared up by the action of the package pusher 130 rotating the package 102 about the contact point 134 as generally indicated by the arrow 136. It is noted that the rest position of the package positioning or centering apparatus of FIGS. 1-4 is shown in FIG. 1 with the pin 126 engaging the locking notch 122.

In FIG. 2, the contact of the package 102 with the guide member 110 has pivotally moved the guide member 110 about the axis represented by the pin 114 by a short distance to transfer the pin 126 from the locking notch 122 as shown in FIG. 1 to the locking notch 124. Further outward pivotal movement of the guide member 110 is restrained by the engagement of the pin 122 with the locking notch 124, since at this time the package 102 has not yet contacted the guide member 08 and hence there is no force tending to pivotally move the guide member 108 outwardly.

The package 102 is once again pushed or conveyed toward the processing station 106 until the package 102 is substantially centered and contacts both guide members 108, 110 as shown in FIG. 3. Upon the application of force to the guide member 108 by the package 102, the guide member 108, and hence the lever 116, is pivoted to move the locking notch 124 away from the pin 126. Since there is an outward force being applied to both guide members 108, 110, the guide members 108 and 110 will both be pivoted outwardly, which pivotal movement is permitted by relative movement of the pin 126 and the slot 120 as shown in FIG. 4. Here again the package 102 is moved to the center of the entryway 100 by sliding movement along the entryway 100 and along the inner face 110A of the guide member 110 as indicated in FIG. 2 by the arrow 137.

The resiliency of the springs 128 is sufficient to hold the levers 116, 118 and guide members 108, 110 in the positions shown in FIG. 1; however, the springs 128 exert an insufficient force to affect the positioning of the package 102 as it moves down the entryway 100 such that once the package 102 engages both guide members 108, 110 and the pin 126 and slot 120 are positioned to slide relative to one another, the guide members 108, 110 move with little resistance out of the way of the package 102 such that, having been centered, the package 102 is then conveyed by the pusher 130 to the processing station 106.

In the article position apparatus of FIGS. 1-4, it is apparent that the first and second levers 116, 118 extend at acute angles relative to the guide members 108, 110. In FIG. 5, an alternate embodiment of article positioning apparatus in accordance with the present invention for centering packages in a package wrapping machine is illustrated wherein the first and second levers extend at obtuse angles relative to the first and second guide members.

Since the embodiment of the invention illustrated in FIG. 5 is very similar to, yet modified from, that of FIGS. 1-4 to show an alternate operation of the positioning apparatus and that the functions of the first and second levers 116 and 118 can be reversed, elements which closely correspond will be identified by the same base numbers but in the 200 number series. In this embodiment, the first and second article guide members 208, 210 extend into the entryway 100 for engaging packages which are being conveyed along the entryway 100. The first and second guide members 208, 210 extend toward the processing station 106 and are mounted along the sides of the entryway 100 adjacent the infeed station 104 for pivotal movement about axes defined by posts 212 and 214 into and above the entryway 100.

First and second levers 216, 218 are connected to the article guide members 208, 210 beneath the entryway 100 via the posts 212, 214 for maintaining the article guide members 208, 210 in an article positioning orientation as shown in FIG. 5 until both of the article guide members 208, 210 are engaged by a package which signals substantial positioning or centering of the package on the package entryway 100. The releasable locking means incorporated into the distal ends of the levers 216, 218 is very similar to that of the embodiment of FIGS. 1-4.

In FIG. 5 the locking means comprises a release slot 220 formed in the distal end of the first lever 216 and having locking notches 222, 224 extending from opposite sides of its distal or notched end. A pin 226 extends from the second lever 218 for engaging the slot 220 and the locking notches 222, 224. Extension springs 228 bias the levers 216, 218 and, hence, the package guide members 208, 210 to an article positioning orientation wherein the pin 126 engages the locking notch 224 formed into the distal or notched end of the slot 220.

In the embodiment of FIG. 5 it is apparent that once again the article guide member 210 on the left side of the entryway 100 is restrained from movement by the pin 226 engaging one of the locking notches, in this case, the locking notch 224. Similarly, if a package initially engages the article guide member 208, it is pivotally moved outwardly to move the first lever 216. Accordingly, the slot 220 and locking notches 224, 222 are moved such that the locking notch 222 engages the pin 226 to restrain further outward movement of the guide members 208, 210 until a package engages both guide members 208, 210. When the guide member 210 is engaged, it is pivotally moved outwardly to remove the pin 226 from the locking notch 222 to permit relative movement of the pin 226 within the slot 220 and thereby release the guide members 208, 210.

It should be apparent that positioning devices in accordance with the present invention can include levers 116, 216, 118, 218, which extend at a large range of angles from acute, as shown in FIGS. 1-4, to obtuse, as shown in FIG. 5, relative to the guide members 108, 208, 110, 210. Similarly, it should be apparent that one of the package guide members will be restrained against any movement until both guide members are engaged by an article whereas the other guide member, if initially engaged, will move a slight amount to change the engagement of the pin with the two locking notches. This movement can be performed by either the guide member and associated lever which includes the pin, as shown in FIGS. 1-4, or the guide member and associated lever which includes the slot and locking notches, as shown in FIG. 5. It is unimportant which guide member moves since it is positioned to compensate for such initial movement. Further, since the guide members 108, 110, 208, 210 are essentially released to permit free movement of an article there beyond once the article has been positioned by the guide members 108, 110, 208, 210, it should be apparent that articles of varying sizes can be centered as shown in FIGS. 1-5 or positioned to a defined location relative to the entryway upon adjustment of the guide members 108, 110, 208, 210. An extreme example of such article positioning relative to an entryway will now be described with reference to FIGS. 6 and 7 for positioning an article to one side of an entryway.

In the embodiment of FIG. 6, a first article guide member 308 is positioned substantially along the right hand side of the entryway 100. The second guide member 310 angularly extends into and substantially across the entryway 100 toward the package wrapping or processing station 106. The first and second guide members 308, 310 are mounted along the sides of the entryway 100 for pivotal movement about axes defined by posts 312, 314 into and above the entryway 100. The slots 132 and the package pusher 130 are skewed to the right side of the package entryway 100 to better engage and push packages in the embodiment of FIG. 6.

In FIG. 6 the control means comprise first and second levers 316, 318 which are connected to the article guide members 308, 310 beneath the entryway 100 via the posts 312, 314 for maintaining the article guide members 308, 310 on an article positioning orientation until both of the article guide members 308, 310 are engaged by a package which signals substantial positioning of the package.

The first and second levers 316, 318 include releasable locking means for locking the first and second guide members 308, 310 for article positioning with the locking means being released upon engagement of both the first and second guide members 308, 310 by a package. In FIG. 6, the locking means comprises an arcuate release slot 320 formed in the distal end of the first lever 316 and having a locking notch 322 extending from one side of the slot 320. A pin 326 extends from the second lever 318 for engaging the slot 320 and the locking notch 322. Extension springs 328 bias the levers 316, 318 and hence, the package guide members 308, 310 to an article positioning orientation wherein the pin 326 engages the locking notch 322 formed into the base or notched end of the slot 320.

For operation of the package positioning apparatus of FIG. 6, a package is initially placed into the package entryway 104 and pushed towards the package wrapping or processing station 106. Under normal circumstances, the package would engage the guide member 310 and would be squared, if necessary, and forced to the right side of the entryway 100 since guide member 310 is restrained from movement by the pin 326 and the locking notch 322. As the package moves to the right of the entryway 100, it would ultimately contact the guide member 308 which would pivotally move a short distance clockwise to in turn move the lever 316 to disengage the locking notch 322 from the pin 326 and permit the pin 326 to travel within the slot 320. Upon release of the pin 326 from the locking notch 322, the guide member 310 moves pivotally outwardly as shown by the arrow 330 to release the package which would have been positioned to the right side of the entryway 100. Pivotal movement of the guide member 310 for two packages 102A and 102B is shown by dot-dash lines in FIG. 6.

If the package was initially placed into the entryway 100 along the right hand side such that it initially engaged the guide member 308, the guide member 308 would pivot slightly to the right as before such that when the package contacted the guide member 310, the pin 326 would already have been removed from the locking notch 322 and the guide member 310 could then move pivotally outwardly to release the package as the pin 326 moved within the slot 320.

An acute angular orientation between the levers 316, 318 and the guide members 308, 310 is shown in FIG. 6 while a corresponding obtuse angular orientation is shown in FIG. 7. It should be apparent that packages could also be positioned to the left side of the entryway 100 by means of a reversal of the components as shown in FIGS. 6 and 7 and that the pin and slot configuration could similarly be reversed in a manner corresponding to the alternate embodiments of FIGS. 1-4 and FIG. 5.

A large variety of alternate embodiments and modifications will be apparent to those skilled in the art after a review of the above disclosure. For example, various configurations of the pin and slot arrangement of the preferred embodiment will be apparent. In addition, engagement of both guide members could be alternately sensed rather than by the pin/locking notch/slot mechanical arrangement disclosed. For example, electrical sensing switches could be utilized on both guide members and an actuable lock used to hold the guide members. When both switches were activated, the lock restraining the first and second levers could be released with the lock being reinstated on a timed cycle of operation after the switches were deactivated. Accordingly, while the method herein described and the simple, reliable, mechanical forms of apparatus for carrying this method into effect, constitute preferred embodiments of this invention, it is to be understood that the invention is not limited to this precise method and these precise forms of apparatus, and that changes may be made in either without departing from the scope of the invention which is defined in the appended claims.

What is claimed is:

1. Article positioning apparatus for a machine wherein articles are conveyed into said machine along an article entryway, said article positioning apparatus comprising:
   first and second convergent article guide members mounted along the sides of said entryway for pivotal movement above and into said entryway for engaging and positioning articles being conveyed along said entryway;
   first and second levers connected to said first and second guide members, respectively, beneath said entryway; and
   releasable locking means incorporated into the distal ends of said first and second levers for maintaining said article guide members in an article positioning orientation until both of said first and second article guide members are engaged by an article upon substantial positioning of said article, said releasable locking means comprising a release slot and a locking notch extending from one side of one end of said slot in said first lever, a pin extending from said second lever for engaging said slot and locking notch, and resilient means for biasing said levers, and hence, said package guide members, to an article positioning orientation wherein said pin engages said locking notch where by an article moving in said entryway will be positioned by engaging one of said guide members which is restrained from movement by said pin and said locking notch until said article engages both guide members to remove said pin from said locking notch for movement along said slot.

2. Article positioning apparatus for a machine as claimed in claim 1 wherein said first and second levers extend at acute angles relative to said first and second guide members, respectively.

3. Article positioning apparatus for a machine as claimed in claim 1 wherein said first and second levers extend at obtuse angles relative to said first and second guide members, respectively.

4. Article positioning apparatus for a machine as claimed in claim 1 wherein said slot is arcuate.

5. Article positioning apparatus for a machine wherein articles are conveyed into said machine along an article entryway, said article positioning apparatus comprising:
   first and second convergent article guide members mounted along the sides of said entryway for pivotal movement above and into said entryway for engaging and positioning articles being conveyed along said entryway;
   first and second levers connected to said first and second guide members, respectively, beneath said entryway; and
   releasable locking means incorporated into the distal ends of said first and second levers for maintaining said article guide members in an article positioning orientation until both of said first and second article guide members are engaged by an article upon substantial positioning of said article, said releasable locking means comprising a release slot and locking notches extending from opposite sides of one end of said slot in said first lever, a pin extending from said second lever for engaging said slot and locking notches, and resilient means for biasing said levers, and hence, said package guide members to an article positioning orientation wherein said pin engages one of said locking notches whereby an article moving in said entryway will be positioned laterally by engaging one of said guide members which is restrained from movement by said pin and said one locking notch until said article engages both guide members to remove said pin from said one locking notch for movement along said slot, or an article moving in said entryway will be positioned by engaging the other of said guide member which will move the associated lever to engage said pin with the other of said locking notches which restrains said levers and guide members from further movement until said article engages both guide members to remove said pin from said other locking notch for movement along said slot.

6. Article positioning apparatus for a machine as claimed in claim 5 wherein said first and second levers extend at acute angles relative to said first and second guide members, respectively.

7. Article positioning apparatus for a machine as claimed in claim 5 wherein said first and second levers extend at obtuse angles relative to said first and second guide members, respectively.

8. Article positioning apparatus for a machine as claimed in claim 5 wherein said slot is arcuate.

9. Article positioning apparatus for a machine having an article infeed station, an article processing station and an article entryway along which an article is conveyed from said infeed station to said processing station, said article positioning apparatus comprising:
   first and second article guide members inwardly directed across a substantial portion of said entryway and extending from the sides thereof for engaging and centering articles in said entryway;
   first and second levers connected to said first and second guide members, respectively, beneath said entryway; and
   releasable locking means incorporated into the distal ends of said first and second levers for maintaining said package guide members in a package centering position and releasing said package guide members to permit the passage of a package once centered on said entryway, said releasable locking means comprising a release slot and locking notches extending from opposite sides of one end of said slot in said first lever, a pin extending from said second lever for engaging said slot and locking notches, and resilient means for biasing said levers, and hence, said package guide members to an article centering orientation wherein said pin engages one of said locking notches whereby an article moving in said entryway also will be moved laterally by engaging one of said guide members which is restrained from movement by said pin and said one locking notch until said article is substantially centered and engages both guide members to remove said pin from said one locking notch for movement along said slot, or an article moving in said entryway will be moved laterally by engaging the other of said guide members which will move the associated lever to engage said pin with the other of said locking notches which restrains said levers and guide members from further movement until said article is substantially centered and engages both guide members to remove said pin from said other locking notch for movement along said slot.

10. Article positioning apparatus for a machine having an article infeed station, an article processing station and an article entryway along which an article is conveyed from said infeed station to said processing station, said article positioning apparatus comprising:
   first and second elongated article guides pivotally mounted near the opposite edges of said entryway adjacent said infeed station, said article guides extending toward said article processing station and extending above and pivoting across said entryway for engaging and centering articles on said entryway;
   a first lever secured to said first elongated article guide and extending inwardly therefrom beneath said article entryway, said first lever defining a slot having first and second locking notches extending from opposite sides at one notched end thereof;
   a second lever having one end secured to said second elongated article guide and extending inwardly therefrom beneath said article entryway, said second lever having a pin extending from its other end, said first and second elongated article guides being controlled by coupling said pin into said slot; and
   resilient means for biasing said first and second elongated article guides into said entryway and said pin into said first locking notch in the notched end of said slot, said first locking notch preventing movement of said second elongated article guide if engaged by an article being conveyed along said entryway until said article also engages said first elongated article guide to remove said pin from said first locking notch and permit movement of said pin within said slot, said first lever being moved to transfer said pin from said first locking notch to said second locking notch if a package first engages said first elongated article guide, any further movement of said first elongated article guide being prevented by said pin and said second locking notch until said article also engages said second elongated article guide to remove said pin from said second locking notch to permit movement of said pin within said slot whereby said first and second elongated article guides pivotally move outwardly to permit an article to pass to said article processing station only upon engagement of said article with both guides which occurs when said article is substantially centered on said entryway.

11. Article positioning apparatus for a machine as claimed in claim 10 wherein said resilient means comprises first and second tension springs extending between said first and second levers and said machine.

12. Article positioning apparatus for a machine as claimed in claim 10 wherein said slot is arcuate.

13. Article positioning apparatus for a machine having an article infeed station, an article processing station and an article entryway along which an article is conveyed from said infeed station to said processing station, said article positioning apparatus comprising:
   first and second elongated article guides pivotally mounted near the opposite edges of said entryway adjacent said infeed station, said article guides extending toward said article processing station and extending above and pivoting across said entryway for engaging and centering articles on said entryway;
   a first lever secured to said first elongated article guide and extending inwardly therefrom beneath said article entryway, said first lever defining a slot having first and second locking notches extending from opposite sides at one notched end thereof;

a second lever having one end secured to said second elongated article guide and extending inwardly therefrom beneath said article entryway, said second lever having a pin extending from its other end, said first and second elongated article guides being controlled by coupling said pin into said slot; and resilient means for biasing said first and second elongated article guides into said entryway and said pin into said first locking notch in the notched end of said slot, said first locking notch and said pin preventing movement of said first elongated article guide if engaged by an article being conveyed along said entryway until said article also engages said second elongated article guide to remove said pin from said first locking notch and permit movement of said pin within said slot, said second lever being moved to transfer said pin from said first locking notch to said second locking notch if a package first engages said second elongated article guide, any further movement of said second elongated article guide being prevented by said pin and said second locking notch until said article also engages said first elongated article guide to remove said pin from said second locking notch to permit movement of said pin within said slot whereby said first and second elongated article guides pivotally move outwardly to permit an article to pass to said article processing station only upon engagement of said article with both guides which occurs when said article is substantially centered on said entryway.

14. Article positioning apparatus for a machine as claimed in claim 13 wherein said resilient means comprises first and second tension springs extending between said first and second levers and said machine.

15. Article positioning apparatus for a machine as claimed in claim 13 wherein said slot is arcuate.

16. In an article conveyor having an infeed station for receiving articles therein, an outfeed station toward which articles are conveyed and an article pusher for moving articles from the infeed station to the outfeed station, improved article alignment apparatus for positioning articles laterally with respect to the conveyor during passage of the articles from the infeed station to the outfeed station comprising:

a pair of laterally-movable guide members positioned on opposite sides of said conveyor and converging from the infeed station toward the outfeed station when in an article positioning orientation to define a throat having a lateral dimension no greater than articles as dimensioned across the conveyor;

first and second levers connected to said first and second guide members, respectively, beneath said entryway; and releasable locking means incorporated into the distal ends of said first and second levers for sensing whether an article being conveyed is misaligned relative to a desired lateral position, said misalignment being indicated by said article contacting one of said guide members, said releasable locking means comprising a release slot and locking notches extending from opposite sides of one end of said slot in said first lever, a pin extending from said second lever for engaging said slot and locking notches, and resilient means for biasing said levers, and hence, said package guide members to an article positioning orientation wherein said pin engages one of said locking notches for locking said guide members in said article positioning orientation to cause the article to move laterally toward said desired lateral position as it is moved along said conveyor until the article contacts the other guide member upon reaching substantial alignment at said desired lateral position to remove said pin from said one locking notch for movement along said slot, or an article moving in said entryway will be positioned by engaging the other of said guide members which will move the associated lever to engage said pin with the other of said locking notches which restrains said levers and guide members from further movement until said article engages both guide members to remove said pin from said other locking notch for movement along said slot whereby outward lateral movement of both guide members enables free passage of said article through said outfeed station.

* * * * *